April 13, 1926.  1,580,621
G. J. MAHIEU
VARIABLE CONDENSER
Filed April 15, 1925
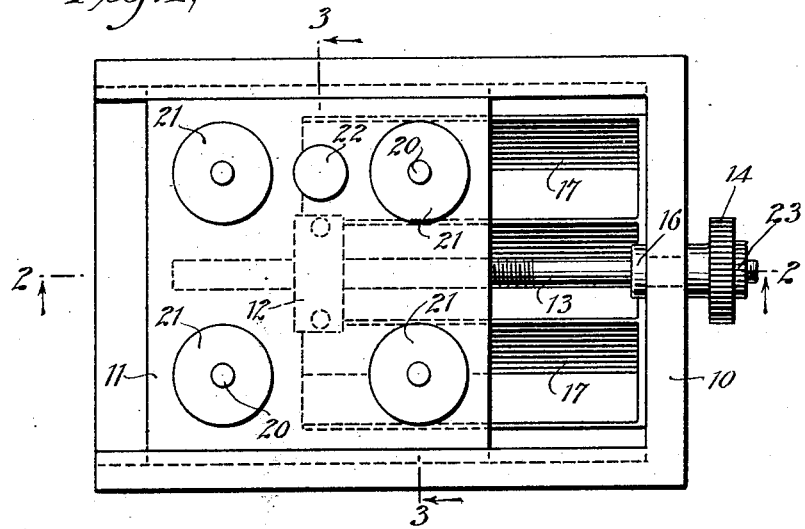
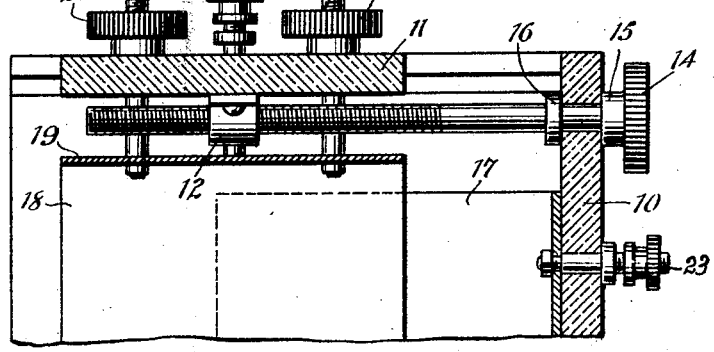
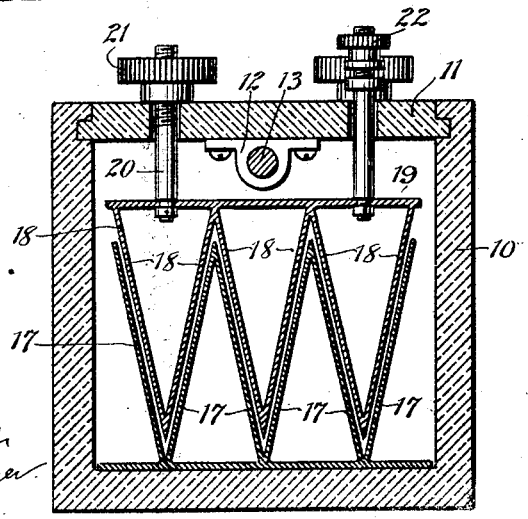
WITNESSES
INVENTOR
G. J. Mahieu
BY
ATTORNEYS Patented Apr. 13, 1926.

1,580,621

UNITED STATES PATENT OFFICE.

GEORGE JOHN MAHIEU, OF RIO DE JANEIRO, BRAZIL.

VARIABLE CONDENSER.

Application filed April 15, 1925. Serial No. 23,311.

*To all whom it may concern:*

Be it known that I, GEORGE JOHN MAHIEU, a citizen of the United States, and a resident of Rio de Janeiro, Brazil, have invented a new and Improved Variable Condenser, of which the following is a full, clear, and exact description.

This invention relates to a variable condenser adapted particularly for use in connection with radio.

An object of the invention is to provide a simple and efficient condenser in which the maximum and minimum capacities can be altered at will, and, by simple manipulations, very fine variations in capacity between these limits can be had.

Another object concerns the provision of a condenser whereby the simple replacement of standard parts permits the upper and lower limits of the condenser to be changed also at will.

The invention is illustrated in the drawings, of which—

Figure 1 is a plan view;

Fig. 2 is a section on the line 2—2 of Fig. 1; and

Fig. 3 is a section on the line 3—3 of Fig. 1.

The form the of invention shown in the drawings is a preferred form, although it is understood that modifications in the construction and arrangement of the parts and in the character of the materials used may be adopted without departing from the spirit of the invention as set forth in the appended claims.

The invention in its general aspect comprises a box in which a plurality of wedge-shaped channel plates are mounted. This box is provided with a cover which is slidable by any suitable means, such as a screw element, in a direction longitudinally of the box. This cover carries a second set of wedge-shaped plates which are spaced slightly distant from the first-mentioned plate. The cover is also provided with suitable manually operated means which support the second set of plates thereon to adjust their vertical distance from the first-mentioned set of plates, whereby the capacity of the condenser can be changed. By sliding the plate back and forth, the area of the plates exposed to each other is changed at will and by very fine gradations.

In the preferred form of the invention I provide a box or receptacle 10 having a slidable cover 11 provided with a lug 12 in which a screw 13 fits. This screw is provided with a knob 14 and collars 15 and 16. By moving the screw the cover can be slid back and forth.

Mounted within the box are a plurality of wedge-shaped plates 17 which are mounted therein on a supporting plate. I also provide a second set of wedge-shaped plates 18. These are mounted from a supporting plate 19 which is connected to stems such as 20 passing through the cover 11 of the box and threaded on their upper ends. These stems are connected by thumb knobs 21 which can be manipulated to adjust the vertical distance of the plates 18 with respect to the plates 17. By manipulating the knob 14, the area of the plates 18 exposed to the plates 17 can be varied from zero to a maximum. By manipulating the knobs 21, the distance between the plates can be varied. In this manner I can set the knobs 21 for any given distance between the plates and then vary the capacity of the condenser through wide limits by manipulating the screw 13. Suitable terminal elements 22 and 23 are connected to the respective sets of plates as shown.

What I claim is:—

1. A condenser comprising a box, a slidable cover therefor, means for sliding said cover, a plurality of plates mounted in the box, a plurality of plates carried by the cover, and means on the cover for adjusting the plates carried thereby in a direction at right angles to the movement of the cover.

2. A condenser, which comprises a receptacle, a plurality of channel-shaped plates mounted therein, said plates having a wedge-shaped formation, a slidable cover, a plurality of wedge-shaped plates mounted on the cover, means for sliding the cover, and means for adjusting the plates carried thereby with respect to the plates mounted in the receptacle.

3. A condenser, which comprises a box, a slidable cover therefor, screw means for sliding the cover longitudinally of the box, a plurality of wedge-shaped channel plates mounted in the box, a plurality of wedge-shaped movable plates carried by the cover, and a manually operable means connecting the last mentioned plates with the cover for adjusting their position vertically with respect to the first mentioned plates.

4. A condenser which comprises a receptacle, a plurality of channel-shaped plates mounted thereon, said plates having a wedge-shaped formation, a movable cover, a plurality of wedge-shaped plates mounted on the cover, means for moving the cover, and means for adjusting the plates carried by the cover with respect to the cover and to the plates mounted in the receptacle.

GEORGE JOHN MAHIEU.